United States Patent [19]

Nakagawa et al.

[11] Patent Number: 4,599,718
[45] Date of Patent: Jul. 8, 1986

[54] METHOD FOR ERASING A LIGHT RECORDING MEDIUM

[75] Inventors: Shiro Nakagawa; Akihiko Kuroiwa; Kenryo Nanba, all of Tokyo, Japan

[73] Assignee: TDK Electronics Co., Ltd., Tokyo, Japan

[21] Appl. No.: 708,385

[22] Filed: Mar. 8, 1985

Related U.S. Application Data

[63] Continuation of Ser. No. 361,378, Mar. 24, 1982, abandoned.

[30] Foreign Application Priority Data

Apr. 7, 1981 [JP] Japan ................................ 56-51160
Sep. 27, 1981 [JP] Japan .............................. 56-152713
Sep. 27, 1981 [JP] Japan .............................. 56-152714

[51] Int. Cl.⁴ ............................................... G11B 7/24
[52] U.S. Cl. ................................... 369/100; 369/275; 369/288; 346/76 L; 346/77 E; 346/151; 365/126
[58] Field of Search ............... 369/275, 283, 284, 286, 369/288, 109, 100, 111; 358/344; 365/126; 346/151, 76 L, 77 E, 135.1

[56] References Cited

U.S. PATENT DOCUMENTS

| | | | |
|---|---|---|---|
| 3,147,062 | 9/1964 | Glenn | 365/126 |
| 3,283,309 | 11/1966 | Gaynor | 365/126 |
| 3,441,939 | 4/1969 | Anderson | 365/126 |
| 3,475,760 | 10/1969 | Carlson | 346/76 L |
| 3,787,873 | 1/1974 | Sato | 365/126 |
| 4,270,130 | 5/1981 | Houle | 346/77 E |
| 4,320,489 | 3/1982 | Crandall | 369/275 |
| 4,359,750 | 11/1982 | Howe | 369/275 |
| 4,360,908 | 11/1982 | Howe | 369/109 |

OTHER PUBLICATIONS

RCA—Media for High-Density Optical Recording; pp. 382-386, Robert A. Bartolini.
IBM—Infrared Dyes for Optical Storage; pp. 105-109; V. B. Jipson and C. R. Jones.

Primary Examiner—Alan Faber
Attorney, Agent, or Firm—Oblon, Fisher, Spivak, McClelland & Maier

[57] ABSTRACT

A method for erasing a light recording medium comprising a thermoplastic resin having a number average molecular weight of 30,000 or less wherein a recording pit is refilled by using a light beam diameter greater than the pit diameter.

2 Claims, 7 Drawing Figures a small hole of about 1 μm as shown as 18 in FIG. 2, and
METHOD FOR ERASING A LIGHT RECORDING MEDIUM This application is a continuation of application Ser. No. 361,378, filed Mar. 24, 1982, now abandoned.

BACKGROUND OF THE INVENTION

1. Field of the Invention

This invention relates to the so-called light recording medium which reads information given as a physical deformation on a recording layer.

2. Description of the Prior Art

What have heretofore been employed as media for recording information are magnetic recording media, but they have several disadvantages, for example, the information recording density is limited, there is also a limitation on improvement of noise characteristics, the medium is not free from abrasion since it is used in the state where the medium is in intimate contact with a head, and so forth. For that reason, light recording media have recently come to attract attention as the substitute for the magnetic recording media.

Among the light recording media, the so-called heat mode recording which utilizes light as heat involves selectively irradiating a medium with coherent light such as laser light to melt or burn the medium to provide a small hole thereon, and recording information by the presence or absence of said small hole. As materials used for the prior art heat mode recording, tellurium, tellurium-selenium-arsenic compounds, mixtures of nitrocellulose and light absorbers etc. are known.

In the prior art heat mode recording, as illustrated in FIG. 1, a laser beam 16 is condensed on a recording layer 12 through a lens 10, and irradiates the recording layer 12 as a minute spot of 1 μmϕ or so. The irradiated area on the recording layer attains a high temperature in a short time of about 100 mS. Where the medium is a nitrocellulosic material, when the irradiated area is heated to 180° C. or higher, said area is burnt and leaves a small hole of about 1 μm as shown as 18 in FIG. 2, and by this hole 18, information of 1 bit is recorded. In FIG. 1 and FIG. 2, 14 is a substrate for supporting the recording layer 12. On the other hand, where the medium is based on tellurium, as shown in FIG. 3, a recording layer 12a melts due to a high temperature and forms a small hole 18a by the surface tension. Since the melting temperature of tellurium is relatively high, the recording layer 12a must be extremely thin in order to ensure the necessary high temperature, and a film thickness of about 50-100 nm is generally chosen.

However, in the prior art light recording as described above, the physical deformation imparted to the medium for recording is permanent, and therefore it has a disadvantage that the record is not erasable and hence the medium is not reusable. So when compared with the prior art magnetic recording system which permits erasing and rewriting of information, the light recording system which does not permit rewriting is greatly restricted in application.

On the other hand, there has heretofore been known a recording system as a recording medium used in photography, and this system involves imparting electron charges to a medium of a thermoplastic material and deforming the medium by attraction force between a separately provided electrode and the electron charges, and by this system, the record may be erased by heating the medium. However, this system has disadvantages that the mechanism to impart electron charges to a medium is complicated and also that electricity consumption is great.

Furthermore, there are also known photochromic materials and chalcogenite materials as the prior art erasble light recording media, but the former has a disadvantage that the record is unstable and hence information spontaneously disappears, and the latter has a disadvantage that they are harmful to the human body.

SUMMARY OF THE INVENTION

Accordingly, this invention eliminates the above-described disadvantages of the prior art light recording media, and its primary object is to provide a non-toxic and inexpensive light recording medium which enables erasing and rewriting of the record and in which the record is stable.

Its second object is to provide such an erasable light recording medium, in which a distinguishable threshold value appears in the light recording layer, thereby a pit is formed always with good reproducibility at a level of the predetermined input energy or higher, while at an energy level below the predetermined value, no pit is formed, thereby the region of the input light or temperature in which reproducibility of the pit formation fluctuates is narrowed, and in which at the same time the heat resistance is high and hence the deterioration in the S/N ratio of the information signal written in the pit during storage at high temperature is reduced, the surface of the pit or its vicinity does not undergo doformation due to the reading light, the S/N ratio of the written information signal is not deteriorated, further the writing sensitivity is high, and still further the S/N ratio of reading is extremely high.

The above objects may be achieved by a light recording medium which has a recording layer provided on a substrate and carries out recording of information by imparting and recording layer with an optically distinguishable physical deformation, which light recording medium is characterized by that the recording layer is composed of a thermally melting material, said physical deformation is given by selectively heating the recording layer, and the substrate is not exposed to the air in the physically deformed area.

Further, the invention of this application also resides in a light recording medium which comprises a recording layer containing a thermoplastic resin and a light absorbing dye or pigment formed on a substrate, and in which said recording layer is melted and softens by irradiation with light to form a recording pit to leave a layer still containing both of the thermoplastic resin and the light absorbing dye or pigment at the bottom of the recording pit, and by heating said recording layer on which said recording pit has been formed, the surface of said recording layer is flattened, which light recording medium is further characterized by that said thermoplastic resin comprises a polyurethane resin or a polyester.

According to this invention, the recording layer is composed of a synthetic resin, and by deformation of the recording layer by selective heating and melting, recording of information is effected. Erasing of the recorded information is effected by uniformly heating the recording layer to remove the deformation. In order to smoothly carry out erasing and rewriting, the substrate for supporting the recording layer should be that in which the deformed area is not exposed to the air. Preferably, the affinity between the substrate and the recording layer is greater than the surface tension of the recording layer at the time of melting or the thickness of the recording layer is greater than the diameter of the recording pit. As the synthetic resin constituting the recording layer, there may be employed a styrene based low polymer, nylon, ABS resin etc.

DETAILED DESCRIPTION OF THE PREFERRED EMBODIMENTS

Figure 1:
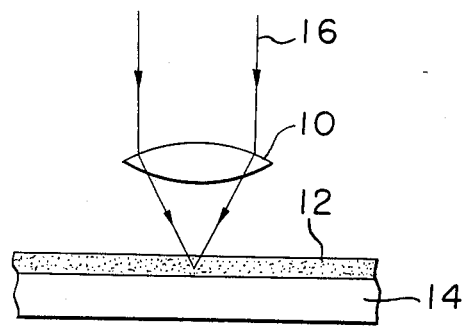
FIG. 1 is a general illustrative view of a light recording system.
Figure 2:
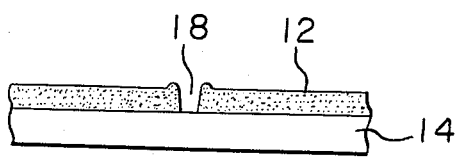
FIG. 2 and FIG. 3 show examples of constructions of the prior art light recording media.
Figure 3:
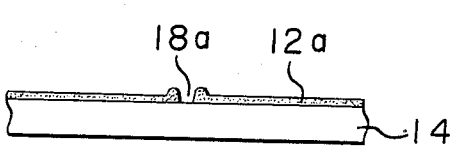
Figure 4:
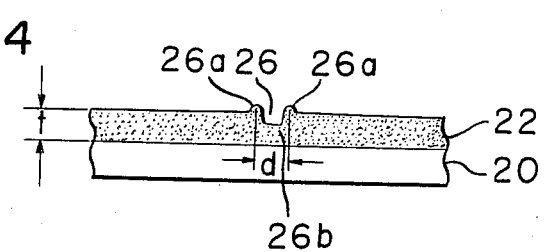
FIG. 4 shows an example of a construction of a light recording medium according to this invention.

FIG. 4 shows an example of a structure of a light recording medium according to one embodiment of this invention, wherein 20 is a substrate made of any acrylic resin or glass, and 22 is a recording layer supported on the substrate 22 and is composed of a styrene based synthetic resin. Preferably, the recording layer is composed of a styrene low polymer (e.g. styrene oligomer), and a dye such as Oleosol Fast Blue EL is incorporated in order to enhance the absorption of light.

When the recording layer is heated selectively by a laser beam, the heated area is melted and a pit (small hole) is formed. In the melted area, by the outward flow of the liquid and the surface tension of the liquid, a concave-shaped pit is formed as shown as 26 in FIG. 4, and by the presence of this pit, information of 1 bit is recorded.

In order to enable erasing and rewriting of the information, that is, erasing and reproducing of the pit, it is essential that a thin film be present at the bottom of the pit 26. In other words, since the substrate 20 is covered with the film 26b at the pit area, it is not directly exposed to the air. The material overflowed from the concaved area of the pit forms an annular bank 26a around the pit. In order to leave the film 26b at the bottom of the pit, it is effective to make the thickness t of the recording layer 22 larger than the diameter d of the pit. Since it is possible to make the diameter d of the pit as small as 1 μm or so, the thickness t of the recording layer is made, for example, 1 μm or more preferably 1–10 μm, especially 3–10 μm. Further, since the styrene low polymer has a low thermal conductivity, it is possible to form a pit by irradiating with a low energy even when the recording layer is thick.

On the other hand, where the thickness t of the recording layer is smaller than the above value, the affinity between the substrate and the recording layer must be greater than the surface tension of the recording layer at the time of melting so as to ensure that the substrate is not exposed to the air in the pit area. As one example which satisfies this requisite, where the recording layer is a styrene oligomer, the substrate may be an acrylic resin or glass. Where the requisite is satisfied, even if the recording layer is melted down to the bottom of the pit, the bottom of the pit is in wet condition with the liquid of the recording layer, and by re-heating, the bank 26a is melted again to refill the pit 26, thereby erasing of the information is achieved. Where the above requisite is not satisfied, the melted recording layer becomes spherical due to the surface tension, and hence to concaved area of the pit is not refilled, and therefore erasing of the information is not achieved.

Reading to the recorded information is effected by irradiating it with a weak laser beam and detecting the reflected light. Where no pit is present, the irradiated light does not irregularly reflect but reflects so that the incident angle and the angle or reflection are equal, and hence the light detection cell in the direction of the angle of reflection strongly responses, whereas in the area where a pit is present, the light detection cell only weakly responses, thereby the presence of the pit is detected.

Figure 5A:
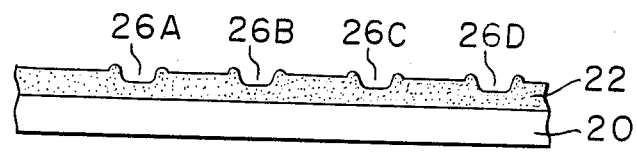
FIG. 5(A), FIG. 5(B) and FIG. 5(C) are illustrative views which explain recording, erasing and rewriting of a light recording medium according to this invention.
Figure 5B:
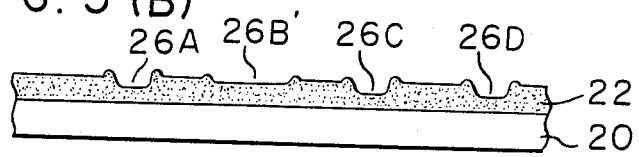
Figure 5C:
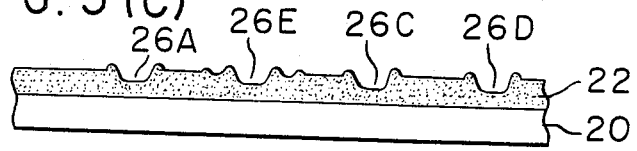

Recording, erasing and re-recording of information is explained by FIGS. 5(A)–(C).

Recording of information is effected by forming pits of 1–2 μm in diameter by irradiating with a laser beam (e.g. of 5 mW or so), and pits 26A, 26B, 26C and 26D in FIG. 5 are formed.

Erasing of information is effected by irradiating and heating the region covering the pit and its vicinity and having a diameter 3 times or more that of the pit diameter with a laster beam or an LED beam. In the heated region, the recording layer is melted to refill the pit, thereby the information is erased. In FIG. 5(B), 26B' shows the state where the pit has been filled again.

By irradiating again the erased region with a laser beam of 1–2 μm, information may be recorded again. 26E in FIG. 5(C) shows a pit re-recorded in the erased region.

Since erasing (refilling) and re-recording may be conducted repeatedly, the light recording medium according to this invention has enabled recording, reproducing, erasing and re-recording of information as simply as with the prior art magnetic recording and also it can achieve high density recording and low noise recording similarly to the ordinary light recording system.

As described above in detail, according to this embodiment of this invention, erasable light recording is thus enabled by making a recording pit so that the substrate is not exposed to the air, and this can possess in combination the features of high density and low noise inherent to the prior art light recording and erasability inherent to the prior art magnetic recording.

Another embodiment of this invention is described below.

This embodiment comprises a recording layer containing a thermoplastic resin and a light absorbing dye or pigment on a substrate.

The recording layer comprises a polyurethane resin or a polyester. The polyurethane resin is a theremoplastic resin which softens or melts with the rise in temperature in the area where the recording light has been irradiated, and deforms to form an erasable recording pit on the surface.

In this case, while any thermoplastic polyurethane resin having urethane bonds may be employed as the polyurethane resin, especially suitable are polyurethane resins obtained by condensation of glycols and diisocyanates, inter alia, polyurethane resins obtained by condensation of alkylene glycols and alkylene diisocyanates being particularly preferred.

The number average molecular weight of such polyurethane resins is preferably 30,000 or less as long as they are obtained as the solid. This is because, with 30,000 or less, the broadening of the abovedescribed threshold value is further reduced, and the writing sensitivity and the S/N ratio of reading are both further enhanced.

Suitable as the polyester are condensates or co-condensates of various dibasic acids, for example aliphatic dibasic acids such as oxalic acid, succinic acid, maleic acid, adipic acid, sebacic acid etc. or aromatic dibasic acids such as isophthalic acid, terephthalic acid etc. with glycols such as ethylene glycol, tetramethylene glycol, hexamethylene glycol etc. And among those, condensates of aliphatic dibasic acids and glycols and co-codensates of glycols, aliphatic dibasic acids and aromatic dibasic acids. Further, modified glyptal resins obtained by esterification modifying a glyptal resin which is a condensate of phthalic anhydride and glycerin, with an aliphatic acid, natural resin etc., and the like may also be suitably employed.

The number average molecular weight of these polyesters is preferably 20,000 or less as long as they are obtained as the solid. This is because with 20,000 or less, the writing sensitivity and the S/N ratio of reading are both further enhanced.

These polyurethane resins or polyesters may be produced by conventional and known procedures, and used after molecular weight classification or purification according to the necessity. Alternatively, commercially available products may also be employed either directly or after classification, purification etc.

In addition to such a polyurethane resin or polyester, a light absorbing dye or pigment is also incorporated in the recording layer.

This light absorbing dye or pigment is that exhibiting a great extinction modulus against the recording light and aiming to permit the temperature to rise in the irradiated area. Accordingly, it is possible to employ various known dyes and various known inorganic or organic pigments, such as carbon black, metal ultrafine powder, lake pigments etc. which absorb light of a wavelength of 400-800 nm depending on the wavelength of the recording light.

The ratio of the polyurethane resin or polyester to the light absorbing dye or pigment to be incorporated in the recording layer may be generally chosen widely in the range of 0.002-10 parts by weight of the latter per part by weight of the polyurethane resin or polyester.

This recording layer may be coated on a substrate by various methods, e.g. using a spinner, coater etc. And, in general, it has a thickness of 0.05 $\mu$m-1 mm.

In addition to the polyurethane resin or polyester and the light absorbing dye or pigment, this recording layer may further contain other additives.

One example of such additives is various oligomers or polymers. In this case, the polymer or oligomer is incorporated in the range of up to about 30% by weight based on the polyurethane resin or polyester, and can enhance adhesion with the support, enhance coating properties, and alter the softening temperature.

In addition, various plasticizers, surfactants, antistatic agents, lubricants, flame retardants, ultraviolet light absorbers, antioxidants, stabilizers, dispersants etc. may also be incorporated.

On the other hand, the substance on which the recording layer is applied and supported is not particularly restricted, and for its material, various kinds of materials may be used. However, in view of thermal conductivity, it is generally preferred to employ various glasses, various ceramics, and various resins such as polymethacrylic resins, polyacrylic resins, polycarbonate resins, phenolic resins, epoxy resins, diallyl phthalate resin, unsaturated polyester resins, polyimide resins etc. The shape and size may be suitably chosen depending on the application, such as a disc, tape, belt, drum etc.

In this case, the medium according to this application may be either one having the above-described recording layer on one surface of the medium or one having such recording layers on both surfaces. Further, it is also possible to use two of those having a recording layer on one surface respectively, arrange them with the recording layers facing to each other at a predetermined space, and seal them, thus preventing dust, scratches etc.

In addition, it is also possible to provide the above-described medium with an undercoat layer of e.g. a reflecting layer made of a metal, a layer of various resins, etc., according to the necessity, and coat a recording layer on such an undercoat layer.

Using the light recording medium of this application thus constituted, writing and erasing of information may be effected as folows:

First, irradiation with the recording light is carried out. The recording light is obtained by condensing a laser beam from various types of lasers having a wavelength of 400-850 nm or so, e.g. He-Ne, He-Cd, Ar, semi-conductors etc., and the output may also be varied. It is also possible to widely alter the scanning conditions, pulse width, condensing conditions etc. of the laser light.

Thus, by irradiating with the recording light by a laser as above, the polyurethane resin or polyester in the recording layer is melted and softens in the irradiated area to form a minute recording pit corresponding to the irradiated light on the surface of the recording layer.

In this case, the recording pit does not reach to the layer bottom of the recording layer under the general recording light irradiation conditions, thereby leaving a layer containing the polyurethane resin or polyester and the light absorbing dye or pigment.

Thus, in consequence of the pit thus formed, erasing hereinbelow described is made possible. And, with the medium of this application, a pit having a good shape is obtained with an extremely good sensitivity. Further, the broadening of the threshold value of the recording light energy required for the pit formation is extremely small. Still further, even when it is stored at high temperatures, the deterioration of the S/N ratio of the reading light from the pit is extremely small.

On the other hand, reading of the information written on the medium from the pit thus formed may be achieved by using reading laser light having a power lower than the recording light, condensing and scanning it, and detecting the output of either transmitted light or reflected light.

At his time, as described above, the pit formed on the medium of this application has a good shape and affords a high S/N ratio on reading. Further, it is free from such inconvenience that the reading light deteriorates the S/N ratio of the information recorded on the medium, records unnecessary information in a region other than the pit area, or the like.

Then, erasing of the information thus recorded may be effected by heating the medium again. At this time, the surface in the form of uneven pits after being recorded in then melted again and returns to flat. As the heating means for erasing, any of laser light irradiation, heating with various heaters, irradiation with an infrared light lamp etc. may be employed.

When such erasing and rewriting are repeated, the writing sensitivity is always good, the pit always exhibits a good shape, reading with a high S/N ratio is achieved, further the S/N ratio is not deteriorated by reading, and the surface always returns to flat by erasing; erasing and writing may therefore be always accurately and successfully effected even when the number of repetition of erasing is increased.

When information is written and thereafter erased during the light recording medium of this application, the information once written may be erased easily and accurately.

Further, the broadening of the threshold value of the light energy or temperature required for the formation of a pit on the recording layer is extremely small, and the range of the input light energy or temperature where reproducibility of the pit formation fluctuates is reduced to an extremely narrow range.

Moreover, the heat resistance is high, and when it is stored at high temperatures such as 50°-60° C., the deterioration of the S/N ratio of the information signal recorded in the pit is extremely small.

Furthermore, the change of the shape of the pit or the change of the shape in the vicinity of the pit by the reading light is extremely small, and the deterioration of the S/N ratio due to the repeated irradiation of the reading light is extremely small.

In addition, the writing sensitivity is good, and a high S/N ratio may be obtained by using either transmitted light or reflected light for reading.

Still further, since erasing is always stably effected, satisfactorily stable writing of information may be achieved on repeating erasing and rewriting.

In this case, when a polyurethane resin having a number average molecular weight of 30,000 or less or a polyester of a number average molecular weight of 20,000 or less is used, these various effects are even further enhanced.

The present inventors have conducted various experiments in order to confirm the effects of this invention. One example thereof is given below.

EXPERIMENTAL EXAMPLE 1

As the polyurethane resin, tetramethyl diisocyanate and hexamethylene glycol were polycondensed in xylol to obtain, after molecular weight classification, a polyurethane of a number average molecular weight of 8,000.

This polyurethane and a lake pigment (C.I. Pigment Blue 1, Coloure Index No. 42595—Lake Fanal Blue B Supra produced by BASF) were mixed at a weight ratio of 3:1, dispersed in a sand grind mill, filtered to remove particles of 0.5 μm or greater, and coated on Pyrex glass plates of 150 mm$\phi$ and 1.2 mm thick to dry thicknesses of 30 μm and 1 μm, respectively, to obtain media according to the invention of this application.

Separately, for comparison, three different comparative media were obtained by replacing the polyurethane resin by a polystyrene, polyethylene and polypropylene having a number average molecular weight of 100,000, respectively.

Among the four media, for those having a recording layer of 30 μm in thickness, the relationship between the deformation of the surface of the recording layer and the temperature was measured. That is, the medium was placed in a constant temperature tank, a needle of 0.64 mm$\phi$ and weighing 50 g. was mounted on the surface of the recording layer, and the temperature was raised at a rate of 5° C./min., during which the relationship with the degree of penetration of the needle into the layer was measured. The width of the temperature between the time when the needle started to penetrate into the layer and the time when the needle reached the predetermined penetration depth was measured, to evaluate the broadening of the threshold value for the pit formation. The results are shown in the following Table 1.

Separately, on these four media, the following experiment was carried out using those having a recording layer of 1 μm in thickness.

First, a He-Ne laser of 10 mW was condensed to 1 μm using an object lens of an NA (Numerical Aperture) of 0.55 and a 40-fold magnification, and pulse irradiated. The pulse width was changed, and the width over which a pit was formed on the surface of the recording layer was measured, this being designated the inverse number of the writing sensitivity (μsec). The results are shown in Table 1. Further, at that time, the environmental temperature was lowered by 20° C., and the pulse of the previously obtained frequency was irradiated to measure of the broadening of the threshold of the input energy. As a result, with the comparative media, the pit formation was brought about, whereas with the medium of this application, the pit formation did not take place.

Thereafter, the pulse width of the above laser was fixed to 0.5 μsec., writing was carried out, then a He-Ne laser of 1 mW was condensed to 1 μm using the same optical system as above, irradiated at 1 μsec. and a repeated frequency of 10 Hz, its reflected light was detected by a photodiode, and the S/N ratio was calculated. In this case, the amplifier system used was that covering a 10M Hz band and the noise used was the RMS value (root mean square value). The results are shown in Table 1.

Further, each medium was stored at 70° C. for 100 hours, after which the percent deterioration of the S/N ratio (%) was measured to evaluate the heat resistance. The results are shown in Table 1.

Still further, the repeated frequency of the pulse of the above reading laser was changed, irradiated for 10 seconds, and the reading frequency which resulted in the pit formation on the surface of the recording layer was measured. The results are given in Table 1.

TABLE 1

| Resin | Threshold Broadening (°C.) | Inverse No. of Writing Sensitivity (μ sec) | S/N Ratio | Heat Resistance Deterioration of S/N Ratio (%) | Pit Formation Frequency by Reading Light (Hz) |
|---|---|---|---|---|---|
| Polyurethane | 42 | 1.1 | 40 | −3 | 340 |
| Polystyrene | 70 | 3.0 | 19 | −40 or more | 50 |
| Polyethylene | 67 | 3.2 | 18 | −40 or more | 60 |
| Polypropylene | 68 | 3.1 | 16 | −40 or more | 70 |

From the results set forth in Table 1, it can be seen that the polyurethane resin is extremely superior in characteristics as compared with other resins.

EXPERIMENTAL EXAMPLE 2

In the medium of this application in Experimental Example 1, by changing the number average molecular weight of the polyurethane resin to 3,000, 8,000, 30,000 and 100,000, respectively, and replacing the organic pigment (referred to as OP) by a copper phthalocyanine type dye Oleosol Fast Blue EL (produced by Sumitomo Chemical Co., Ltd., referred to as D), 13 nm carbon black (referred to as CB) and 10 nm Ni ultrafine powder (produced by Shinkū Yakin Co., Ltd., referred to as Ni), respectively, various media were prepared and similar experimental as in Experimental Example 1 were carried out.

The results are shown in Table 2.

TABLE 2

| Molecular Weight of Polyurethane | Absorber | Threshold Broadening (°C.) | Inverse No. of Writing Sensitivity (μsec) | S/N Ratio |
|---|---|---|---|---|
| 3,000 | D | 41 | 0.7 | 48 |
| " | CB | 40 | 0.8 | 46 |
| " | OP | 40 | 0.8 | 45 |
| 8,000 | D | 42 | 0.8 | 46 |
| " | Ni | 41 | 0.9 | 44 |
| " | OP | 40 | 0.9 | 43 |
| 30,000 | D | 42 | 0.9 | 42 |
| " | CB | 42 | 1.0 | 40 |
| " | Ni | 42 | 1.0 | 40 |
| 100,000 | D | 44 | 2.6 | 17 |
| " | CB | 43 | 2.7 | 15 |
| " | OP | 43 | 2.8 | 14 |

As regards the heat resistance, the deterioration was 6% or less with all the media, and for the noise generation due to the reading light, there was no pit formation observed at a frequency of 300 Hz with any medium.

From the results set forth in Table 2, it can be seen that more preferable results are obtained when the number average molecular weight of the polyurethane resin is 30,000 or less.

In addition, it was confirmed that similar effects are also manifested when using that for a semiconductor laser etc. as the dye or pigment, or using other thermoplastic polyurethane resins.

EXPERIMENTAL EXAMPLE 3

As the polyester, succinic acid and tetramethylene glycol were condensed to obtain, after molecular weight classification, an aliphatic polyester resin of a number average molecular weight of 10,000.

This polyester and a lake pigment (C.I. Pigment Blue 1, Colour Index No. 42595—Lake Fanal Blue B Supra produced by BASF) were mixed at a weight ratio of 3:1, dispersed in a sand grind mill, filtered to remove particles of 0.5 μm or greater, and coated on Pyrex glass plates of 150 mmφ and 1.2 mm thick to dry thicknesses of 30 μm and 1 μm, respectively, to obtain media according to the invention of this application.

Separately, for comparison, three different comparative media were obtained replacing the polyester by a polystyrene, polyethylene and polypropylene having a number average molecular weight of 100,000, respectively.

Among the four media, for those having a recording layer of 30 μm in thickness, the relationship between the deformation of the surface of the recording layer and the temperature was measured. That is, the medium was placed in a constant temperature tank, a needle of 0.64 mmφ and weighing 50 g. was mounted on the surface of the recording layer, and the temperature was raised at a rate of 5° C./min., during which the relationship with the degree of penetration of the needle into the layer was measured. The width of the temperature between the time when the needle started to penetrate into the layer and the time when the needle reached the predetermined penetration depth was measured, to evaluate the broadening of the threshold value for the pit formation. The results are shown in the following Table 3.

Separately, on these four media, the following experiment was carried out using those having a recording layer of 1 μm in thickness.

First, a He-Ne laser of 10 mW was condensed to 1 μm using an object lens of an NA (Numerical Aperture) of 0.55 and a 40-fold magnification, and pulse irradiated. The pulse width was changed, and the width over which a pit was formed on the surface of the recording layer was measured, this being designated the inverse number of the writing sensitivity (μsec.). The results are shown in Table 3. Further, at that time, the environmental temperature was lowered by 20° C., and the pulse of the previously obtained frequency was irradiated to measure the broadening of the threshold of the input energy. As a result, with any comparative medium, the reproducibility was poor, i.e. a pit was sometimes formed, whereas with the medium of this application, the pit formation did not take place.

Thereafter, the pulse width of the above laser was fixed to 0.5 μsec., writing was carried out, then a He-Ne laser of 1 mW was condensed to 1 μm using the same optical system as above, irradiated at 1 μsec. and a repeated frequency of 10 Hz, its reflected light was detected by a photodiode, and the S/N ratio was calculated. In this case, the amplifier system used was that covering a 10M Hz band and the noise used was the RMS value (root means square value). The results are shown in Table 3.

Further, each medium was stored at 70° C. for 100 hours, after which the percent deterioration of the S/N ratio (%) was measured to evaluate the heat resistance. The results are shown in Table 3.

Still further, the repeated frequency of the pulse of the above reading laser was changed, irradiated for 10 seconds, and the reading frequency which resulted in the pit formation on the surface of the recording layer was measured. The results are given in Table 3.

TABLE 3

| Resin | Threshold Broadening (°C.) | Inverse No. of Writing Sensitivity (μ sec) | S/N Ratio | Heat Resistance Deterioration of S/N Ratio (%) | Pit Formation Frequency by Reading Light (Hz) |
|---|---|---|---|---|---|
| Polyester | 42 | 1.1 | 37 | −3 | 350 |
| Polystyrene | 70 | 3.0 | 19 | −40 or more | 50 |
| Polyethylene | 67 | 3.2 | 18 | −40 or more | 60 |

TABLE 3-continued

| Resin | Threshold Broadening (°C.) | Inverse No. of Writing Sensitivity (μ sec) | S/N Ratio | Heat Resistance Deterioration of S/N Ratio (%) | Pit Formation Frequency by Reading Light (Hz) |
|---|---|---|---|---|---|
| Polypropylene | 68 | 3.1 | 16 | −40 or more | 70 |

From the results set fortn in Table 3, it can be seen that the polyester is extremely superior in characteristics as compared with other resins.

EXPERIMENTAL EXAMPLE 4

In the medium of this application in Experimental Example 3, by changing the number average molecular weight of the polyester to 1,000, 3,000, 10,000 and 100,000, respectively, and replacing the organic pigment (referred to as OP) by a copper phthalocyanine type dye Oleosol Fast Blue EL (produced by Sumitomo Chemical Co., Ltd., referred to as D), 13 mm carbon black (referred to as CB) and Ni ultrafine powder of 10 nm in average diameter (produced by Shinkū Yakin Co., Ltd., referred to as Ni), respectively, various media were prepared and similar experiments as in Experimental Example 3 were conducted.

The results are shown in Table 4.

TABLE 4

| Molecular Weight of Polyester | Absorber | Threshold Broadening (°C.) | Inverse No. of Writing Sensitivity | S/N Ratio |
|---|---|---|---|---|
| 1,000 | D | 40 | 0.6 | 48 |
| " | Ni | 40 | 0.7 | 45 |
| " | OP | 39 | 0.8 | 45 |
| 3,000 | D | 34 | 0.9 | 45 |
| " | CB | 29 | 1.0 | 40 |
| " | OP | 32 | 1 2 | 40 |
| 10,000 | D | 45 | 1.1 | 30 |
| " | CB | 40 | 1.2 | 25 |
| " | Ni | 42 | 1.3 | 25 |
| 100,000 | D | 65 | 2.1 | 19 |
| " | CB | 63 | 2.2 | 17 |
| " | OP | 64 | 2.3 | 17 |

As regards the heat resistance, the deterioration observed was only −5% or less with all the media.

For the noise generation due to the reading light, there was no pit formation observed at a reading light frequency of 300 Hz with any medium.

From the results set forth in Table 4, it can be seen that more preferable results are obtained when the number average molecular weight of the polyester is 20,000 or less.

EXPERIMENTAL EXAMPLE 5

Various media as set forth in the following Table 5 were prepared, and the results shown in the same table were obtained.

In this case, the co-condensed polyester was that obtained by co-condensing oxalic acid, terephthalic acid (oxalic acid/terephthalic acid=3) with hexamethylene glycol, and the modified glyptal resin was that obtained from phthalic anhydride, glycerin and oleic acid, each being used after molecular weight classification.

TABLE 5

| Polyester | Molecular Weight | Absorber | Threshold Broadening (°C.) | Inverse No. of Writing Sensitivity | S/N Ratio |
|---|---|---|---|---|---|
| Co-condensed | 1,000 | OP | 40 | 0.8 | 46 |
| " | " | CB | 41 | 0.7 | 47 |
| " | 3,000 | D | 43 | 0.7 | 47 |
| " | " | Ni | 42 | 1.0 | 45 |
| " | 10,000 | Ni | 42 | 1.1 | 43 |
| " | " | OP | 42 | 1.2 | 42 |
| " | 100,000 | OP | 43 | 3.5 | 15 |
| Modified Glyptal | 1,000 | CB | 40 | 0.8 | 48 |
| " | " | D | 41 | 0.7 | 49 |
| " | 3,000 | OP | 41 | 1.0 | 46 |
| " | " | Ni | 41 | 0.9 | 47 |
| " | 10,000 | OP | 41 | 1.2 | 45 |
| " | " | CB | 41 | 1.2 | 45 |
| " | 100,000 | CB | 44 | 3.8 | 17 |

From the results set forth in Table 5, it can be seen that any of the media of this application exhibits excellent characteristics.

In addition, it was confirmed that similar effects are also manifested when using that for a semiconductor laser etc. as the dye or pigment.

We claim:

1. A method for erasing information recorded on a light recording medium comprising a substrate and a recording layer formed on the substrate wherein the recording layer is composed essentially of a thermoplastic resin having a number average molecular weight of 30,000 or less and a light adsorbing dye or pigment, which method comprises refilling a recording pit in the recording layer by irradiating and heating a region of the recording layer covering the pit and its vicinity with a laser or LED beam having a diameter greater than the diameter of the pit.

2. The method according to claim 1, wherein the beam has a diameter at least 3 times the diameter of the pit.

* * * * *